(12) United States Patent
Huffman

(10) Patent No.: US 6,266,178 B1
(45) Date of Patent: Jul. 24, 2001

(54) GUARDRING DRAM CELL

(75) Inventor: James D. Huffman, Richardson, TX (US)

(73) Assignee: Texas Instruments Incorporated, Dallas, TX (US)

(*) Notice: Subject to any disclaimer, the term of this patent is extended or adjusted under 35 U.S.C. 154(b) by 0 days.

(21) Appl. No.: 09/468,595

(22) Filed: Dec. 21, 1999

Related U.S. Application Data

(60) Provisional application No. 60/113,982, filed on Dec. 28, 1998.

(51) Int. Cl.[7] ............................. G02B 26/00; G02B 26/08; G02F 1/03; G09G 3/84
(52) U.S. Cl. ........................ 359/291; 359/292; 359/245; 359/248; 359/298; 345/771; 345/84; 345/85
(58) Field of Search ........................ 359/305, 308, 359/320, 279, 244, 315, 285, 245, 248, 290, 291, 295, 292, 298; 356/356, 28, 28.5; 345/108, 84, 85, 771, 109, 32, 147; 257/98, 296; 385/18

(56) References Cited

U.S. PATENT DOCUMENTS

| | | | |
|---|---|---|---|
| 5,103,423 | * 4/1992 | Miyazaki et al. | 365/189.11 |
| 5,411,769 | 5/1995 | Hornbeck | 427/534 |
| 5,547,893 | * 8/1996 | Sung | 437/52 |
| 5,583,688 | 12/1996 | Hornbeck | 359/291 |
| 5,818,095 | 10/1998 | Sampsell | 257/435 |

* cited by examiner

Primary Examiner—Georgia Epps
Assistant Examiner—Tuyen Tra
(74) Attorney, Agent, or Firm—Charles A. Brill; Wade James Brady, III; Frederick J. Telecky, Jr.

(57) ABSTRACT

An improved memory cell (600) for use in a high-intensity light environment. The memory (600) comprises a substrate (616) capable of generating photocarriers when exposed to radiant energy, at least one transistor (602), at least one capacitor (604), and address node (610) electrically connecting the transistor (602) and the capacitor (604), and an active collector region (626). The active collector region (626) is fabricated in the substrate (616) in a position to allow the active collector region (626) to recombine photocarriers traveling through the substrate (616) thus preventing the photocarriers from reaching the address node (610).

15 Claims, 6 Drawing Sheets

GUARDRING DRAM CELL

CROSS-REFERENCE TO RELATED APPLICATIONS

This application claims priority under 35 USC § 119(e)(1) of provisional application No. 60/113,982 filed Dec. 28, 1998.

The following patents and/or commonly assigned patent applications are hereby incorporated herein by reference:

| U.S. Pat. No. | Filing Date | Issue Date | Title |
| --- | --- | --- | --- |
| 5,411,769 | Sept. 29, 1993 | May 2, 1995 | Method of Producing Micromechanical Devices |
| 5,583,688 | Dec. 21, 1993 | Dec. 10, 1996 | Multi-Level Digital Micromirror Device |
| 5,818,095 | Aug. 11, 1992 | Oct. 6, 1998 | High-Yield Spatial Light Modulator With Light Blocking Layer |

FIELD OF THE INVENTION

This invention relates to the field of micromirror devices, more particularly to memory cell configurations suitable for use with micromirror devices in high-illumination environments.

BACKGROUND OF THE INVENTION

Micromechanical devices are small structures typically fabricated on a semiconductor wafer using techniques such as optical lithography, doping, metal sputtering, oxide deposition, and plasma etching which have been developed for the fabrication of integrated circuits.

A digital micromirror device (DMD™), sometimes referred to as deformable micromirror device, is a type of micromechanical device. Other types of micromechanical devices include accelerometers, pressure and flow sensors, gears and motors. While some micromechanical devices, such as pressure sensors, flow sensors, and DMDs have found commercial success, other types have not yet been commercially viable.

Digital micromirror devices are primarily used in optical display systems. In display systems, the DMD is a light modulator that uses digital image data to modulate a beam of light by selectively reflecting portions of the beam of light to a display screen. While analog modes of operation are possible, DMDs typically operate in a digital bistable mode of operation and as such are the core of the first true digital full-color image projection systems.

Micromirrors have evolved rapidly over the past ten to fifteen years. Early devices used a deformable reflective membrane which, when electrostatically attracted to an underlying address electrode, dimpled toward the address electrode. Schlieren optics were used to illuminate the membrane and create an image from the light scattered by the dimpled portions of the membrane. Schlieren systems enabled the membrane devices to form images, but the images formed were very dim and had low contrast ratios, making them unsuitable for most image display applications.

Later micromirror devices used flaps or diving board-shaped cantilever beams of silicon or aluminum, coupled with dark-field optics to create images having improved contrast ratios. Flap and cantilever beam devices typically used a single metal layer to form the top reflective layer of the device. This single metal layer tended to deform over a large region, however, which scattered light impinging on the deformed portion. Torsion beam devices use a thin metal layer to form a torsion beam, which is referred to as a hinge, and a thicker metal layer to form a rigid member, or beam, typically having a mirror-like surface: concentrating the deformation on a relatively small portion of the DMD surface. The rigid mirror remains flat while the hinges deform, minimizing the amount of light scattered by the device and improving the contrast ratio of the device.

Recent micromirror configurations, called hidden-hinge designs, further improve the image contrast ratio by fabricating the mirror on a pedestal above the torsion beams. The elevated mirror covers the torsion beams, torsion beam supports, and a rigid yoke connecting the torsion beams and mirror support, further improving the contrast ratio of images produced by the device.

Due to the extreme environments in which micromirror devices are operated, photogenerated carriers in the semiconductor substrate are a concern to the stability of a charge storage device such as a DRAM. Attempts to eliminate the photogenerated carriers have focused on metal light shields to prevent photons from reaching the silicon substrate and creating photocarriers. While largely successful, metal shields require an additional metal layer on the surface of the micromirror devices. This metal layer that not only drives up the processing and cost associated with the fabrication of micromirrors, but also lowers the yield of the micromirror fabrication process. What is needed is a better system and method for eliminating or minimizing the effects of photocarriers in micromirror substrates.

SUMMARY OF THE INVENTION

Objects and advantages will be obvious, and will in part appear hereinafter and will be accomplished by the present invention which provides an improved DRAM cell for use in a high-intensity ambient light environment, a method of forming the improved DRAM cell, and a display system utilizing the improved DRAM cell. According to one embodiment of the disclosed invention, a micromirror device is provided. The micromirror device comprises a substrate, at least one memory cell, at least one electrode, and at least one deflectable member. An active collection region forms the bottom plate of the capacitor and acts as a guardring that recombines photocarriers before they reach the address node between a transistor and capacitor in the memory cell.

According to one embodiment of the disclosed invention, the active collector region is an n-doped semiconductor region encircling said address node. Alternatively, the active collector region is a p-doped semiconductor region on an n-type substrate. The address node typically is located directly beneath the deflectable member on the substrate to take maximum advantage of the shielding provided by the deflectable member.

According to yet another embodiment of the disclosed invention, a memory cell is provided. The memory cell comprises a substrate, at least one transistor, at least one capacitor, an address node connecting the at least one transistor, and an active collector region. The active collector region is fabricated in the substrate in a position to recombine photocarriers traveling through the substrate from reaching the address node. According to one embodiment of the disclosed invention, the active collector region encircles the address node and forms the bottom plate of the capacitor. The active collector region typically is an n-doped semiconductor region on a p-type substrate, but alternatively is formed by a p-doped semiconductor region on an n-type substrate.

According to yet another embodiment of the disclosed invention, an image projection system is provided. The image projection system comprises a light source, a micromirror device, a controller, and a projection lens. The micromirror device is positioned on a light path and selectively reflects portions of a beam of light along a second light path in response to image data signals. The controller provides the image data signals to the micromirror device, and the projection lens focuses the selectively reflected light onto an image plane. The micromirror device comprises a substrate, at least one memory cell, an active collector region, at least one address electrode, and at least one deflectable member. The active collector region positioned to block photocarriers traveling through the substrate from reaching an address node between a transistor and capacitor in the memory cell.

The memory cell described above provides or enables several improvements to the conventional micromirror device. First, the use of a DRAM cell reduces the number of transistors required to from a memory cell from five to only one. Eliminating four transistors from each memory cell greatly reduces the number of interconnections that must be formed to allow the memory cell to operate. Because there are less interconnections, one metal interconnect layer can be eliminated. Eliminating an entire metal layer reduces the cost of the device, but also reduces the light shielding provided by the interconnections. Nevertheless, the increase light immunity provided by the DRAM cell described herein enables the use of a DRAM cell in a micromirror device in spite of the reduced shielding provided by the remaining interconnections.

The elimination of four transistors also reduces the physical size of the memory cell. The small memory cell enables the use of smaller mirror elements. The smaller mirror elements provide increased image resolution for a given micromirror array size.

The new DRAM design provides a 3–4X improvement in light immunity. Light immunity is measured by the time the capacitor can hold an effective potential across the plates of the capacitor. Since the retention of the memory has been improved, and the size of the memory capacitor has been reduced, the refresh time of the memory cell is increased, allowing a longer time between writes to the memory cell.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE PREFERRED EMBODIMENTS

Figure 1:
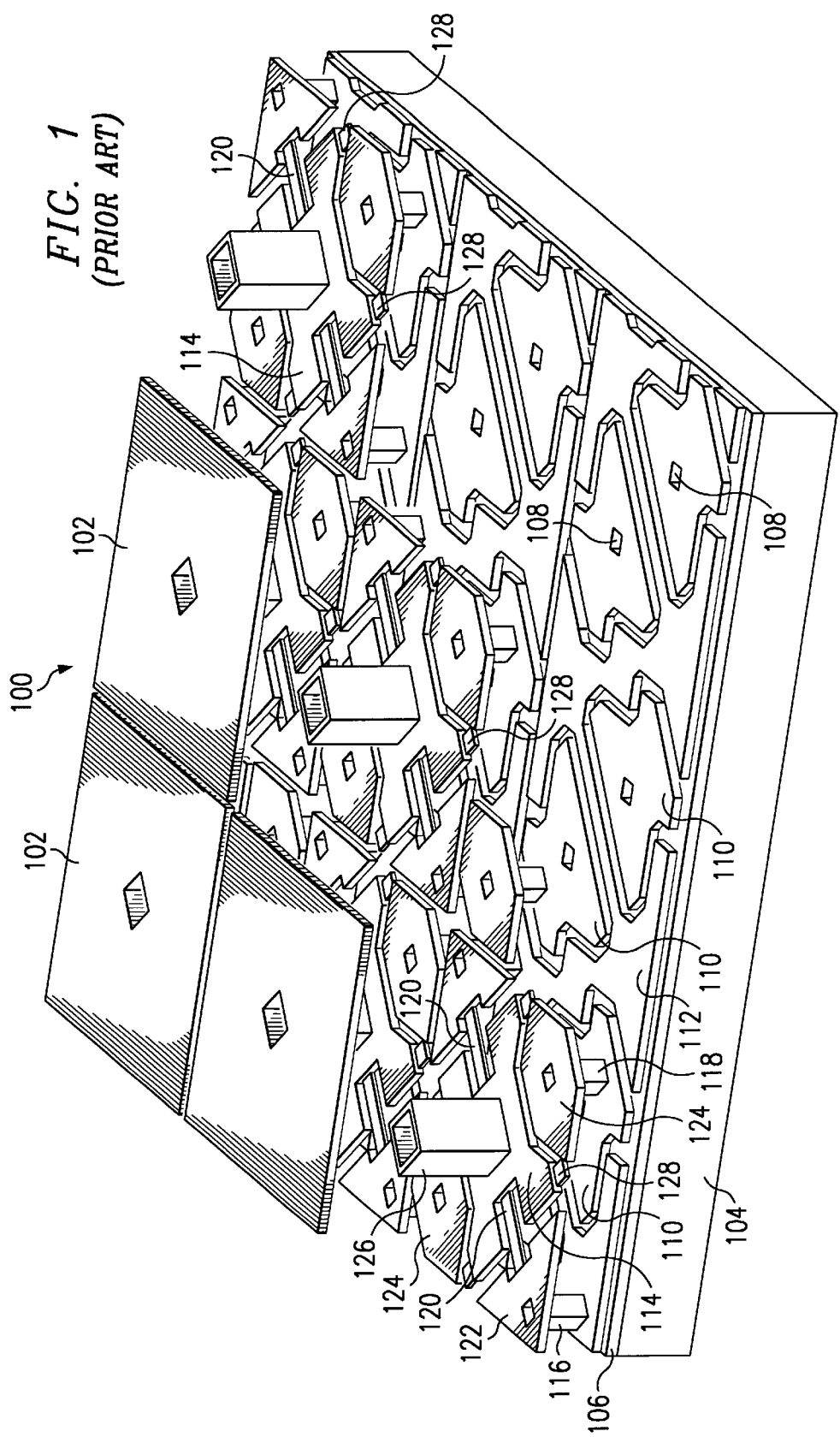
FIG. 1 is a perspective view of a small portion of a prior art digital micromirror array.
Figure 2:
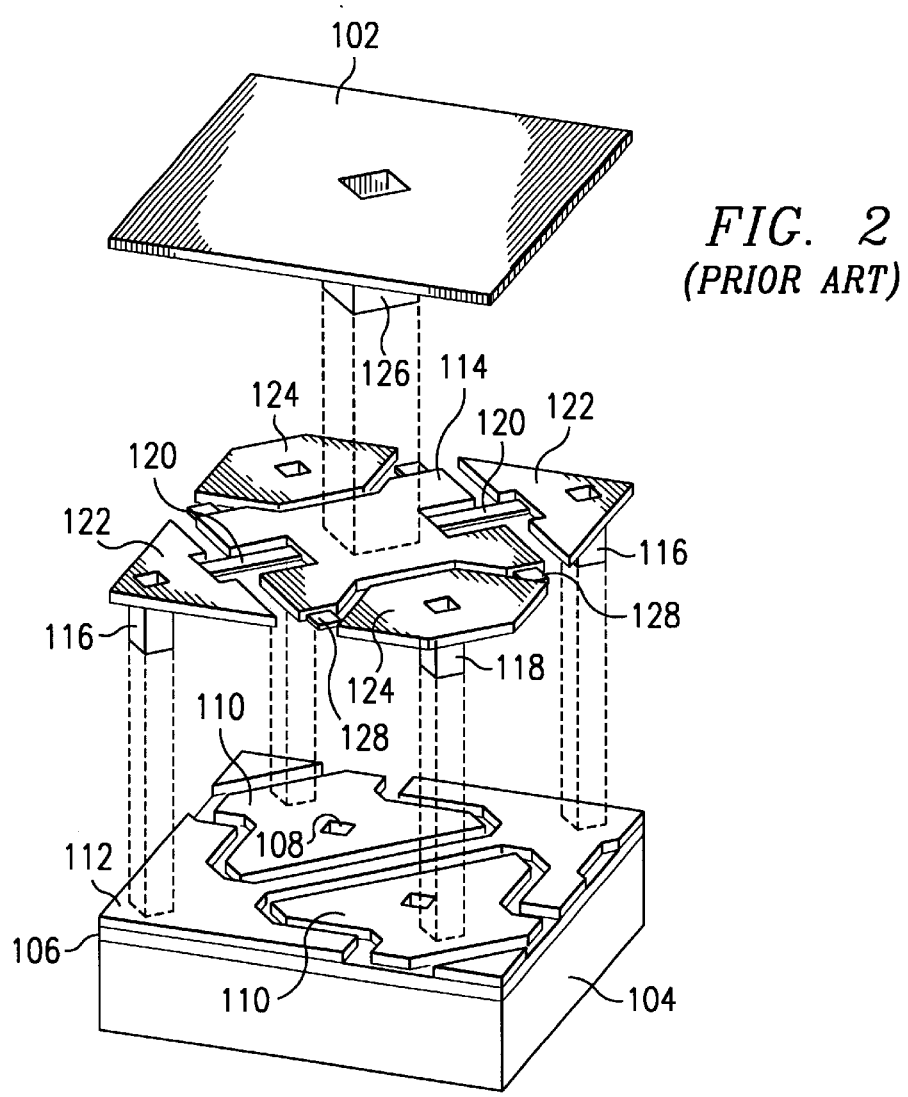
FIG. 2 is an exploded view of one element of the DMD array of FIG. 1.

A typical hidden-hinge DMD 100 is actually an orthogonal array of DMD cells, or elements. This array often includes more than a thousand DMD rows and columns of DMDs. FIG. 1 shows a small portion of a DMD array of the prior art with several mirrors 102 removed to show the underlying mechanical structure of the DMD array. FIG. 2 is an exploded view of a single DMD element of the prior art further detailing the relationships between the DMD structures.

A DMD is fabricated on a semiconductor, typically silicon, substrate 104. Electrical control circuitry is typically fabricated in or on the surface of the semiconductor substrate 104 using standard integrated circuit process flows. This circuitry typically includes, but is not limited to, a memory cell associated with, and typically underlying, each mirror 102 and digital logic circuits to control the transfer of the digital image data to the underlying memory cells. Voltage driver circuits to drive bias and reset signals to the mirror superstructure may also be fabricated on the DMD substrate, or may be external to the DMD. Image processing and formatting logic is also formed in the substrate 104 of some designs. For the purposes of this disclosure, addressing circuitry is considered to include any circuitry, including direct voltage connections and shared memory cells, used to control the direction of rotation of a DMD mirror.

Some DMD configurations use a split reset configuration which allows several DMD elements to share one memory cell—thus reducing the number of memory cells necessary to operate a very large array, and making more room available for voltage driver and image processing circuitry on the DMD integrated circuit. Split reset is enabled by the bistable operation of a DMD, which allows the contents of the underlying memory to change without affecting the position of the mirror 102 when the mirror has a bias voltage applied.

The silicon substrate 104 and any necessary metal interconnection layers are isolated from the DMD superstructure by an insulating layer 106 which is typically a deposited silicon dioxide layer on which the DMD superstructure is formed. Holes, or vias, are opened in the oxide layer to allow electrical connection of the DMD superstructure with the electronic circuitry formed in the substrate 104.

The first layer of the superstructure is a metalization layer, typically the third metalization layer and therefore often called M3. The first two metalization layers are typically required to interconnect the circuitry fabricated on the substrate. The third metalization layer is deposited on the insulating layer and patterned to form address electrodes 110 and a mirror bias connection 112. Some micromirror designs have landing electrodes which are separate and distinct structures but are electrically connects to the mirror bias connection 112. Landing electrodes limit the rotation of the mirror 102 and prevent the rotated mirror 102 or hinge yoke 114 from touching the address electrodes 110, which have a voltage potential relative to the mirror 102. If the mirror 102 contacts the address electrodes 110, the resulting short circuit could fuse the torsion hinges 116 or weld the mirror 102 to the address electrodes 110, in either case ruining the DMD.

Since the same voltage is always applied both to the landing electrodes and the mirrors 102, the mirror bias connection and the landing electrodes are preferably combined in a single structure when possible. The landing electrodes are combined with the mirror bias connection 112 by including regions on the mirror bias/reset connection 112, called landing sites, which mechanically limit the rotation of the mirror 102 by contacting either the mirror 102 or the torsion hinge yoke 114. These landing sites are often coated with a material chosen to reduce the tendency of the mirror 102 and torsion hinge yoke 114 to stick to the landing site.

Mirror bias/reset voltages travel to each mirror 102 through a combination of paths using both the mirror bias/reset metalization 112 and the mirrors and torsion beams of adjacent mirror elements. Split reset designs require the array of mirrors to be subdivided into multiple subarrays each having an independent mirror bias connection. The landing electrode/mirror bias 112 configuration shown in FIG. 1 is ideally suited to split reset applications since the DMD elements are easily segregated into electrically isolated rows or columns simply by isolating the mirror bias/reset layer between the subarrays. The mirror bias/reset layer of FIG. 1 is shown divided into rows of isolated elements.

A first layer of supports, typically called spacervias, is fabricated on the metal layer forming the address electrodes 110 and mirror bias connections 112. These spacervias, which include both hinge support spacervias 116 and upper address electrode spacervias 118, are typically formed by spinning a thin spacer layer over the address electrodes 110 and mirror bias connections 112. This thin spacer layer is typically a 1 $\mu$m thick layer of positive photoresist. After the photoresist layer is deposited, it is exposed, patterned, and deep UV hardened to form holes in which the spacervias will be formed. This spacer layer and a thicker spacer layer used later in the fabrication process are often called sacrificial layers since they are used only as forms during the fabrication process and are removed from the device prior to device operation.

A thin layer of metal is sputtered onto the spacer layer and into the holes. An oxide is then deposited over the thin metal layer and patterned to form an etch mask over the regions that later will form hinges 120. A thicker layer of metal, typically an aluminum alloy, is sputtered over the thin layer and oxide etch masks. Another layer of oxide is deposited and patterned to define the hinge yoke 114, hinge cap 122, and the upper address electrodes 124. After this second oxide layer is patterned, the two metals layers are etched simultaneously and the oxide etch stops removed to leave thick rigid hinge yokes 114, hinge caps 122, and upper address electrodes 124, and thin flexible torsion beams 120.

A thick spacer layer is then deposited over the thick metal layer and patterned to define holes in which mirror support spacervias 126 will be formed. The thick spacer layer is typically a 2 $\mu$m thick layer of positive photoresist. A layer of mirror metal, typically an aluminum alloy, is sputtered on the surface of the thick spacer layer and into the holes in the thick spacer layer. This metal layer is then patterned to form the mirrors 102 and both spacer layers are removed using a plasma etch.

Once the two spacer layers have been removed, the mirror is free to rotate about the axis formed by the torsion hinge. Electrostatic attraction between an address electrode 110 and a deflectable rigid member, which in effect form the two plates of an air gap capacitor, is used to rotate the mirror structure. Depending on the design of the micromirror device, the deflectable rigid member is the torsion beam yoke 114, the beam or mirror 102, a beam attached directly to the torsion hinges, or a combination thereof. The upper address electrodes 124 also electrostatically attract the deflectable rigid member.

The force created by the voltage potential is a function of the reciprocal of the distance between the two plates. As the rigid member rotates due to the electrostatic torque, the torsion beam hinges resist deformation with a restoring torque which is an approximately linear function of the angular deflection of the torsion beams. The structure rotates until the restoring torsion beam torque equals the electrostatic torque or until the rotation is mechanically blocked by contact between the rotating structure and a fixed component. As discussed below, most micromirror devices are operated in a digital mode wherein sufficiently large bias voltages are used to ensure full deflection of the micromirror superstructure.

Micromirror devices are generally operated in one of two modes of operation. The first mode of operation is an analog mode, sometimes called beam steering, wherein the address electrode is charged to a voltage corresponding to the desired deflection of the mirror. Light striking the micromirror device is reflected by the mirror at an angle determined by the deflection of the mirror. Depending on the voltage applied to the address electrode, the cone of light reflected by an individual mirror is directed to fall outside the aperture of a projection lens, partially within the aperture, or completely within the aperture of the lens. The reflected light is focused by the lens onto an image plane, with each individual mirror corresponding to a fixed location on the image plane. As the cone of reflected light is moved from completely within the aperture to completely outside the aperture, the image location corresponding to the mirror dims, creating continuous brightness levels.

The second mode of operation is a digital mode. When operated digitally, each micromirror is fully deflected in either of the two directions about the torsion beam axis. Digital operation uses a relatively large voltage to ensure the mirror is fully deflected. Since it is advantageous to drive the address electrode using standard logic voltage levels, a bias voltage, typically a negative voltage, is applied to the mirror metal layer to increase the voltage difference between the address electrodes and the mirrors. Use of a sufficiently large mirror bias voltage—a voltage above what is termed the collapse voltage of the device—ensures the mirror will deflect to the closest landing electrodes even in the absence of an address voltage. Therefore, by using a large mirror bias voltage, the address voltages need only be large enough to deflect the mirror slightly.

To create an image using the micromirror device, the light source is positioned at an angle equal to twice the angle of rotation so that mirrors rotated toward the light source reflect light in a direction normal to the surface of the micromirror device and into the aperture of a projection lens—creating a bright pixel on the image plane. Mirrors rotated away from the light source reflect light away from the projection lens—leaving the corresponding pixel dark. Intermediate brightness levels are created by pulse width modulation techniques in which the mirror is rapidly and repetitively rotated on and off. The duty cycle of the mirror determines the quantity of light reaching the image plane. The human eye integrates the light pulses and the brain perceives a flicker-free intermediate brightness level.

Full-color images are generated by using three micromirror devices to produce three single-color images, or by sequentially forming three single-color images using a single micromirror device illuminated by a beam of light passing through three color filters mounted on a rotating color wheel.

Typical micromirror devices use a six-transistor static random access memory (SRAM) cell for each micromirror element is a reset block. The micromirror elements are 17 $\mu$m across, allowing a minimal amount of room on the substrate beneath each micromirror element to fabricate the memory cell.

Future plans call for smaller micromirror elements. These smaller micromirror elements will not provide enough room to form a six-transistor SRAM under each micromirror element. Therefore, a smaller memory cell is necessary to enable the reduced micromirror element sizes. A very small memory cell, such as a conventional dynamic random access memory (DRAM), requires only a single transistor and capacitor.

Figure 3:
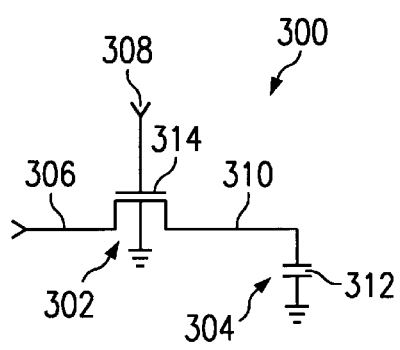
FIG. 3 is a schematic view of a DRAM cell modified for use with a micromirror device.
Figure 4:
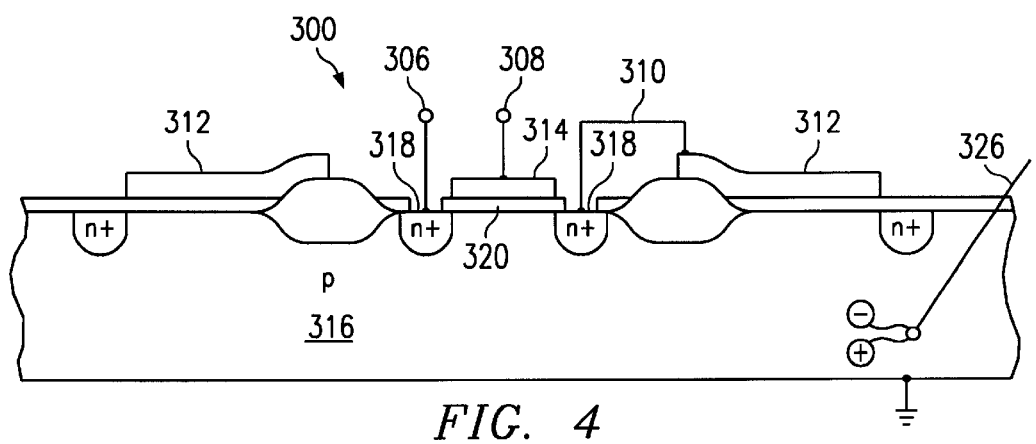
FIG. 4 is a cross-section side view plan view of the DRAM cell of FIG. 3.
Figure 5:
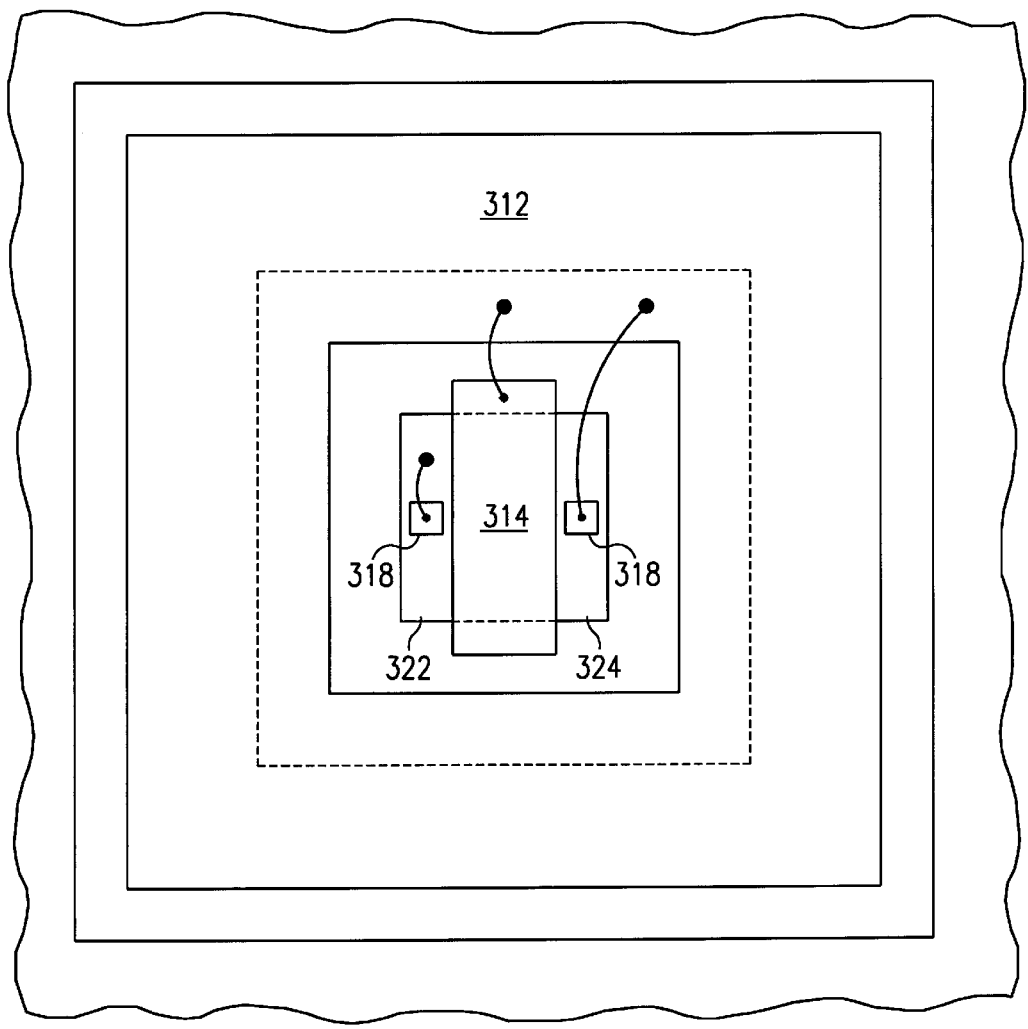
FIG. 5 is a plan view of the DRAM cell of FIG. 3.

FIG. 3 is a schematic view of a DRAM cell modified for use with a micromirror device. FIG. 4 is a cross-section side view of the DRAM cell of FIG. 3. FIG. 5 is a plan view of the DRAM cell of FIG. 3. In FIG. 3, a memory cell 300 is shown.

The memory cell includes one transistor 302 and one depletion capacitor 304. Depending on the input data provided to the memory cell 300 on the bit line 306, charge is stored on the upper plate of capacitor 304 when the write line 308 is active. When the write line 308 is active the transistor is turned on allowing any circuit driving the bit line to store charge on the capacitor 304. When the write line 308 is inactive, the transistor is turned off to provide isolation between the capacitor 304 and the bit line 306.

When used with a micromirror device, the address node 310 of the capacitor 304 is connected to the mirror and a differential bias voltage is provided across the two address electrodes. The voltage between each address electrode and the mirror creates an electrostatic attraction between the address electrode and the mirror. The strength of the electrostatic attraction depends on the voltage differential and on the distance between the address electrode and the mirror and determines the movement of the mirror between the two address electrodes.

FIG. 4 shows a cross-section side view of the memory cell. In FIG. 4, the physical representation of each element shown in the schematic view of FIG. 3 retains the same element number shown in FIG. 3. The memory cell is fabricated on a P-doped semiconductor substrate 316, typically silicon. The upper plate 312 of the capacitor 304, and the gate 314 of the transistor 302 are formed in a polycrystalline layer of the substrate semiconductor material. Vias 318 are opened through an oxide layer 320 to allow connection of the address line 306 to the source 322 of the transistor 302, and connection of the transistor drain 324 to the polysilicon capacitor 312.

Photon-generated electrical charges, or photocarriers, are formed when photons 326 strike the semiconductor substrate. The energy of the photon 326 frees an electron from the atom struck by the photon 326 to form an electron-hole pair. The electron-hole pair, comprised of a positively-charged hole and a negatively-charged electron, may recombine, or the electron and the hole may persist. If the electron-hole pair persists, the hole typically diffuses through the grounded substrate 316 and does not effect the operation of the circuit.

The electron may migrate toward the address node 310 of the memory cell 300. If the electron reaches the address node 310, it will recombine and reduce the charge stored on the capacitor 304. Depending on the number of electrons reaching the address node 310, and the initial charge stored on the polysilicon upper plate 312 of the capacitor 304, the address voltage stored in the memory cell 300 may be insufficient to deflect the micromirror toward the desired address electrode.

Figure 6:
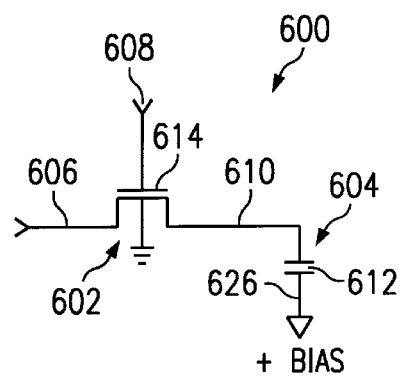
FIG. 6 is a schematic view of a DRAM cell, according to one embodiment of the disclosed invention, modified for use with a micromirror device.
Figure 7:
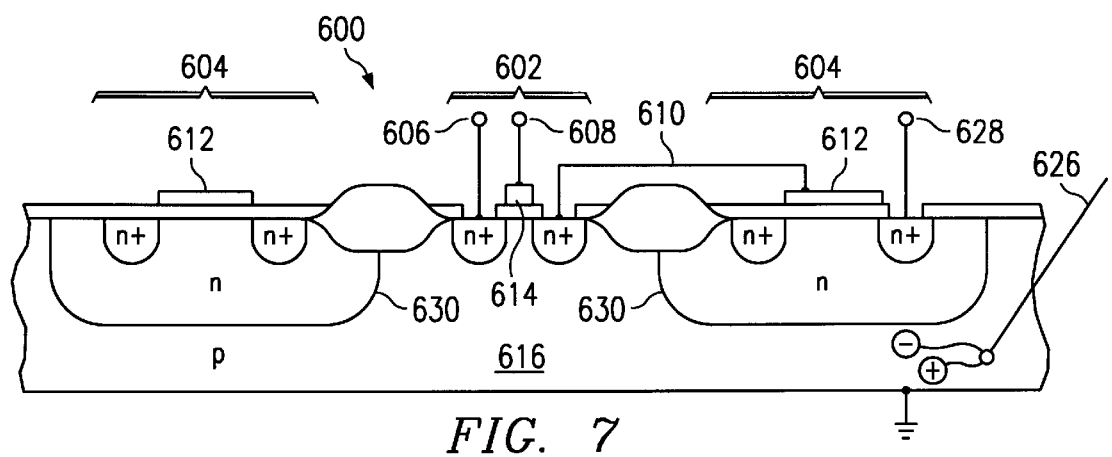
FIG. 7 is a cross-section side view plan view of the DRAM cell of FIG. 6 having improved light immunity.
Figure 8:
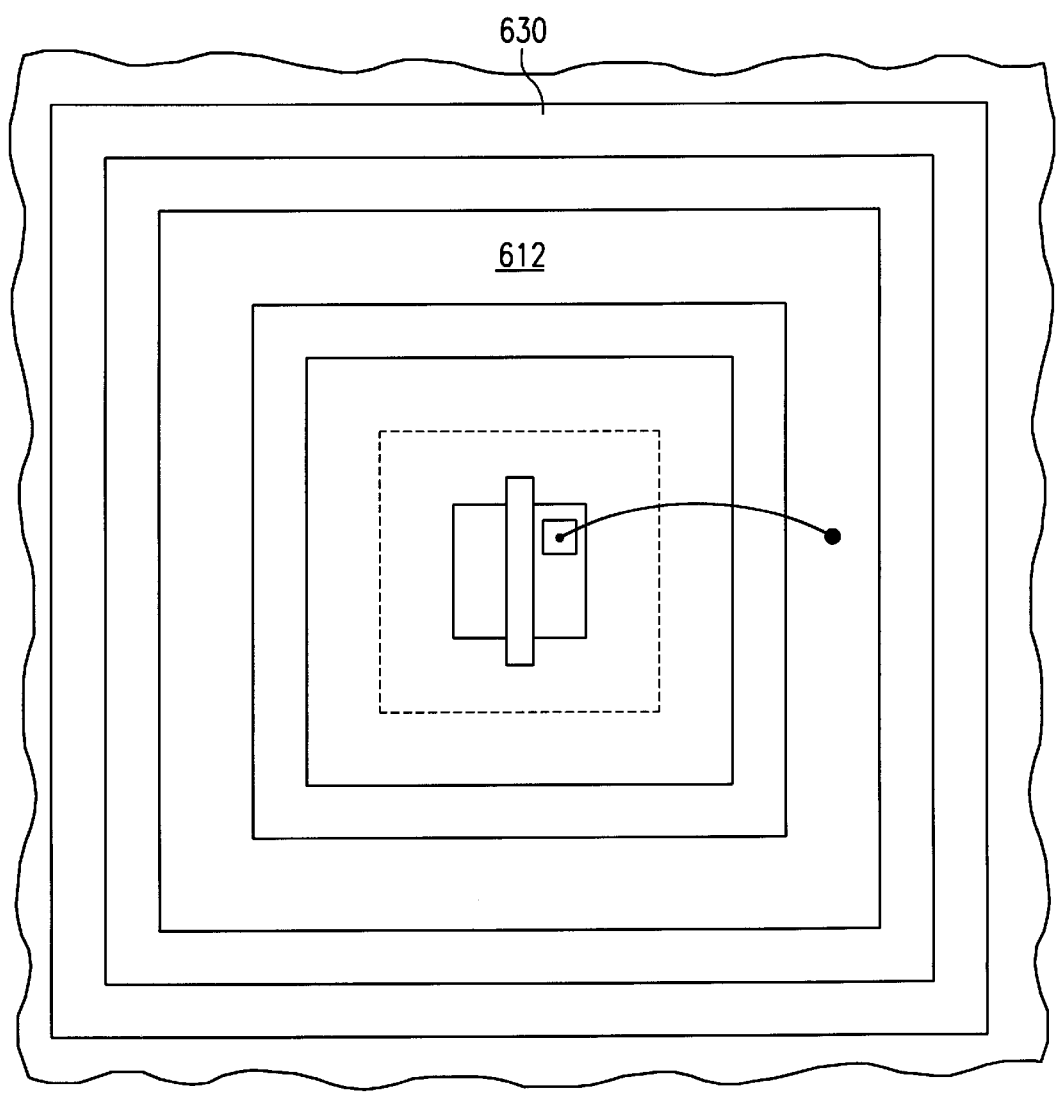
FIG. 8 is a plan view of the DRAM cell of FIG. 6.

FIG. 6 is a schematic view of a DRAM cell, according to one embodiment of the disclosed invention, that is modified for use in an intense ambient light environment. FIG. 7 is a cross-section side view of the DRAM cell of FIG. 6. FIG. 8 is a plan view of the DRAM cell of FIG. 6.

As shown in FIGS. 5, 6, and 7, the lower plate of the capacitor 604 is positively biased. The lower plate of the capacitor 604 is formed by an n-doped region of the substrate 616, called an n-well 630. The n-well 630 receives a positive voltage bias through its connection 328 to a positive supply voltage. In operation, the n-well 630 serves to collect photogenerated electrons. As described above, photons 626 striking the substrate 616 create electron-hole pairs. The holes are collected by the negatively biased substrate 616 and swept away to the negative power supply. The electrons, which were allowed to migrate toward the address node 310 of the DRAM in FIGS. 4 and 5, are now collected by the n-wells 630 and swept to the positive power supply, effectively protecting the charge stored on the capacitor 604.

Three features of the memory cell 600 shown in FIG. 6, 7, and 8 combine to dramatically increase the ability of the memory cell to retain charge data in the presence of high ambient light levels. First, because the DRAM configuration with its single transistor structure has only a single address node and is much smaller size than the five-transistor SRAM designs previously used, the address node is placed in the center of the micromirror element. Less photons strike the substrate in the center of the micromirror element because the micromirror itself provides a shield to block the majority of the incident light.

The second feature of memory cell 600 that improves its performance in a high ambient light environment is the presence of the n-well. Since the n-well collects photogenerated electrons, and the substrate collects photogenerated holes, the holes cannot reach the address node 610, and electrons cannot reach the lower plate of the accumulation capacitor.

The third feature of memory cell 600 that improves its performance in high ambient light environments is the depth of the n-well. The typical depth of the n-well is 1.5 $\mu$m. The typical depth of the address node 610 is 0.3 $\mu$m. The length a photon can travel through the semiconductor substrate, called the absorption length, depends on the energy of the photon. Red light has an absorption length of 1.6 $\mu$m in silicon. Blue light has an absorption length of 0.8 $\mu$m in silicon. Since most photogenerated electrons are formed at a depth less than the depth of the n-well and since photogenerated electrons cannot pass through the n-well to reach the address node 610, the electrons must travel down to pass beneath the n-well and then up to reach the address node 610—a highly unlikely path. Furthermore, the depth of the depletion zone is adjusted simply by changing the positive bias applied to the n-well. The same advantages are also obtained by forming the transistors with a p-doped well.

Figure 9:
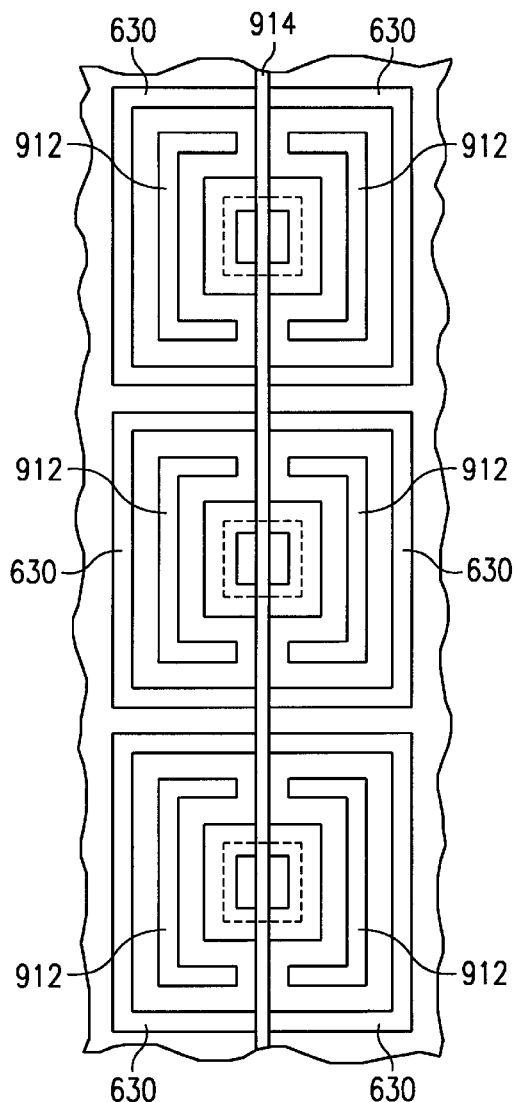
FIG. 9 is a plan view of three of the DRAM cells of FIGS. 6 and 7 using a continuous polysilicon word line to connect the DRAM cells

FIG. 9 is a plan view of three of the DRAM cells of FIGS. 6 and 7. The layout shown in FIG. 9 allows the use of a continuous polysilicon word line 914, or gate, to connect the DRAM cells. The upper plate of the capacitor, which was shown as a ring-shaped upper plate 612 around the memory cell in FIG. 8, is now separated into two halves 912, one on each side of the continuous polysilicon word line.

Figure 10:
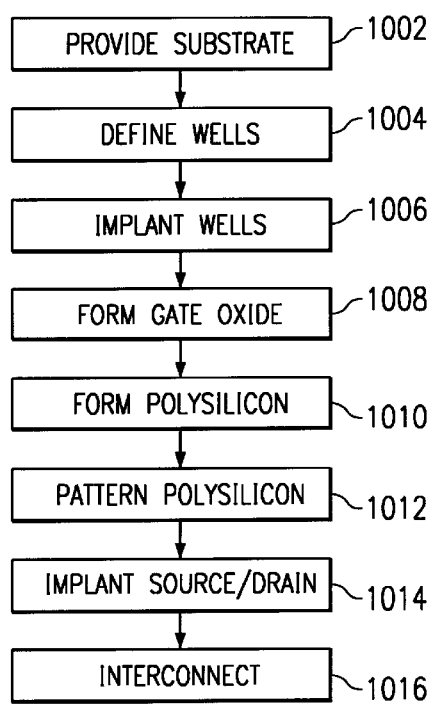
FIG. 10 is a flowchart showing the process of fabricating the improved micromirror memory cell of FIGS. 6, 7, 8, and 9.

FIG. 10 is a summary of the major process steps required to form the improved DRAM cell. In FIG. 10, a p-doped substrate is provided in step 1002. An implant mask is patterned to define the wells forming the guardrings in step 1004. The wells are implanted in step 1006. A gate oxide and polysilicon layer are formed in steps 1008 and 1010. The polysilicon layer is patterned to form the upper plate of the capacitor in step 1012. Step 1014 represents the source and drain implant process, and step 1016 shows the formation of the metalization interconnects.

Figure 11:
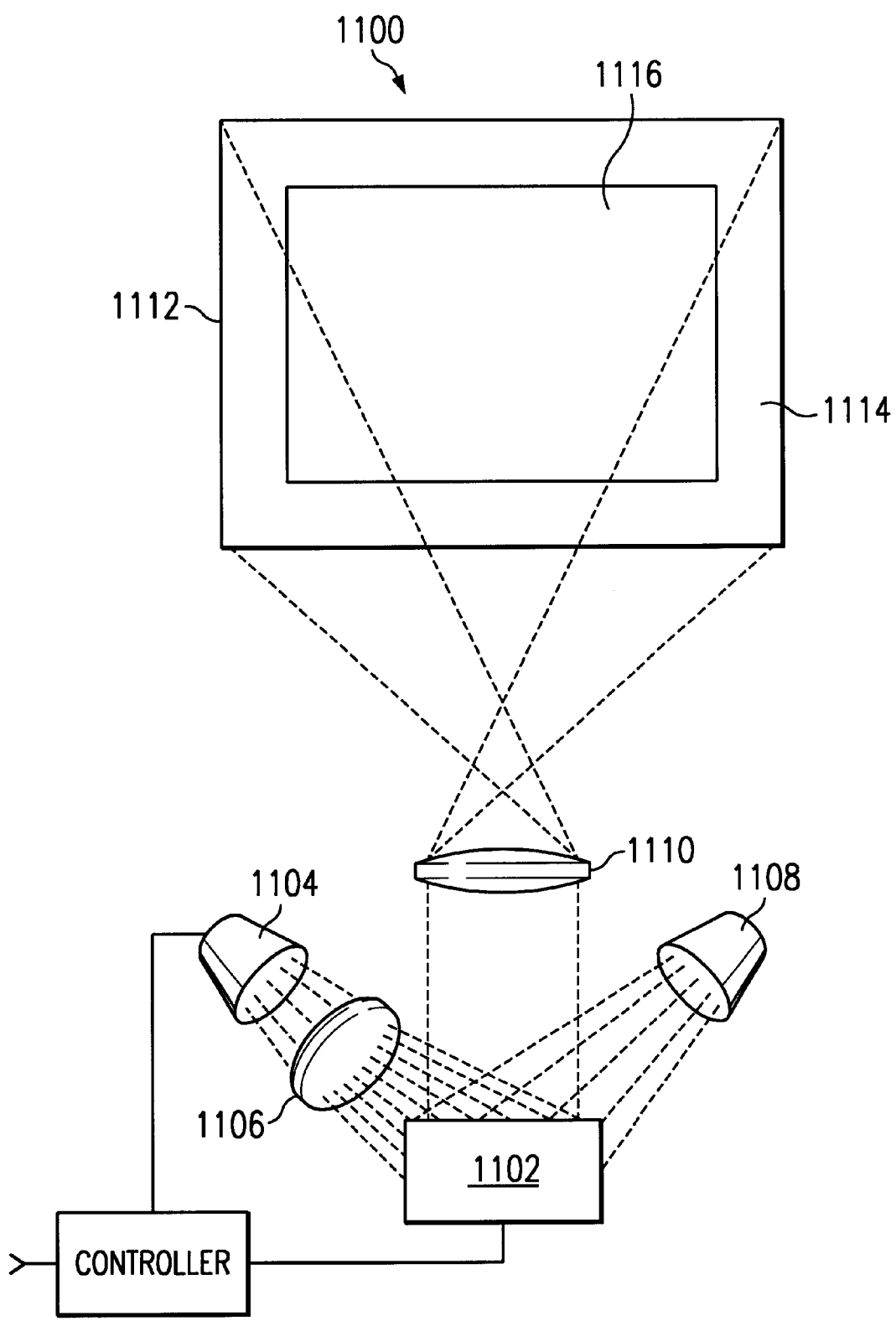
FIG. 11 is a schematic view of a display system using a micromirror device having the improved DRAM cell of FIGS. 6, 7, 8, and 9.

FIG. 11 is a schematic view of an image projection system 1100 using an improved micromirror 1102 according to the present invention. In FIG. 11, light from light source 1104 is focused on the improved micromirror 1102 by lens 1106. Although shown as a single lens, lens 1106 is typically a group of lenses and mirrors which together focus and direct light from the light source 1104 onto the surface of the micromirror device 1102. Image data and control signals from controller 1114 cause some mirrors to rotate to an on position and others to rotate to an off position. Mirrors on the micromirror device that are rotated to an off position reflect light to a light trap 1108 while mirrors rotated to an on position reflect light to projection lens 1110, which is shown as a single lens for simplicity. Projection lens 1110 focuses the light modulated by the micromirror device 1102 onto an image plane or screen 1112.

Although the improved memory cell having a doped n-well region acting as an active collector region has been discussed in terms of a DRAM cell, it should be understood that the same principles are applicable to the formation of SRAM cells and are likewise useful to protect the SRAM cells from charge loss due to the photo-generation of electron-hole pairs.

Thus, although there has been disclosed to this point a particular embodiment for an n-well memory cell that is resistant to photogenerated carriers and method thereof, it is not intended that such specific references be considered as limitations upon the scope of this invention except insofar as set forth in the following claims. Furthermore, having described the invention in connection with certain specific embodiments thereof, it is to be understood that further modifications may now suggest themselves to those skilled in the art, it is intended to cover all such modifications as fall within the scope of the appended claims.

What is claimed is:

1. A micromirror device comprising:
    a substrate, said substrate capable of generating photocarriers when exposed to radiant energy;
    at least one memory cell fabricated on said substrate, said memory cell comprising:
        at least one transistor;
        at least one capacitor, said at least one capacitor comprising a first plate and a second plate
        an active collector region fabricated in said substrate and forming said second plate, said active collector region positioned to prevent photocarriers traveling through said substrate from reaching an address node; and
        said an address node electrically connecting said first plate of said at least one capacitor to said at least one transistor;
    at least one address electrode formed on said substrate; and
    at least one deflectable member supported by said substrate, said deflectable member operable to deflect when electrostatically attracted to at least one of said address electrodes by a voltage differential between said address electrode and said deflectable member.

2. The micromirror device of claim 1, wherein said active collector region encircles said address node.

3. The micromirror device of claim 1, wherein said active collector region is a doped semiconductor region.

4. The micromirror device of claim 1, wherein said active collector region is an n-doped semiconductor region.

5. The micromirror device of claim 1, wherein said active collector region is at least 1.5 $\mu$m deep.

6. The micromirror device of claim 1, wherein said active collector region is positively biased.

7. The micromirror device of claim 1, wherein said first plate is polysilicon.

8. The micromirror device of claim 1, wherein said first plate is negatively biased relative to said second plate.

9. The micromirror device of claim 1, wherein said second plate is an accumulation layer formed in said active collector region.

10. The micromirror device of claim 1, wherein said first plate encircles said address node.

11. The micromirror device of claim 1, said first plate comprising two polysilicon regions.

12. The micromirror device of claim 1, said address node electrically connected to at least one of said address electrodes.

13. The micromirror device of claim 1, said address node electrically connected to at least one of said deflectable members.

14. The micromirror device of claim 1, wherein said address node is located on said substrate directly beneath said deflectable member.

15. A image projection system comprising:
    a light source for providing a beam of light along a light path;
    a micromirror device on said light path for selectively reflecting portions of said beam of light along a second light path in response to image data signals;
    a controller for providing image data signals to said micromirror device; and
    a projection lens on said second light path for focusing said selectively reflected light onto an image plane;
    said micromirror device comprising;
        a substrate, said substrate capable of generating photocarriers when exposed to radiant energy;
        at least one memory cell fabricated on said substrate, said memory cell comprising:

at least one transistor;

at least one capacitor, said at least one capacitor comprising a first plate and a second plate;

an active collector region fabricated in said substrate and forming said second plate, said active collector region positioned to prevent photocarriers traveling through said substrate from reaching said address node; and an address node electrically connecting said first plate of said at least one capacitor to said at least one transistor;

at least one address electrode formed on said substrate; and at least one deflectable member supported by said substrate, said deflectable member operable to deflect when electrostatically attracted to at least one of said address electrodes by a voltage differential between said address electrode and said deflectable member.

* * * * *